Aug. 1, 1967
J. J. JAMES
3,333,804
CABLE CLAMP
Filed Sept. 16, 1965
3 Sheets-Sheet 1
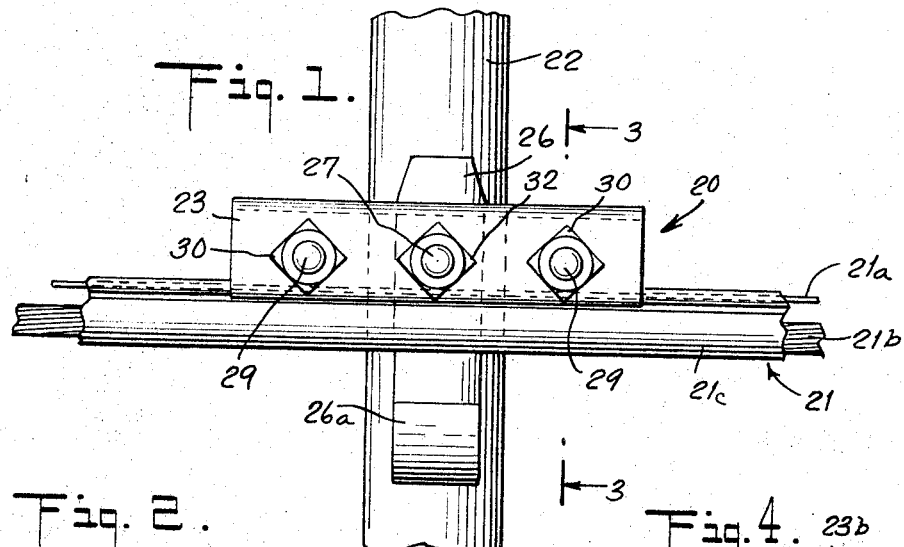
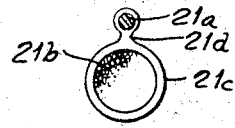
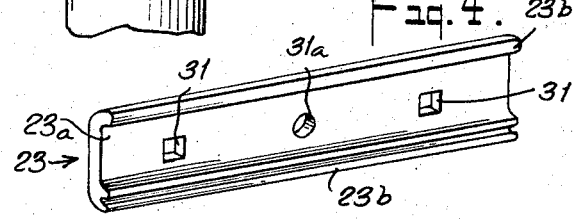
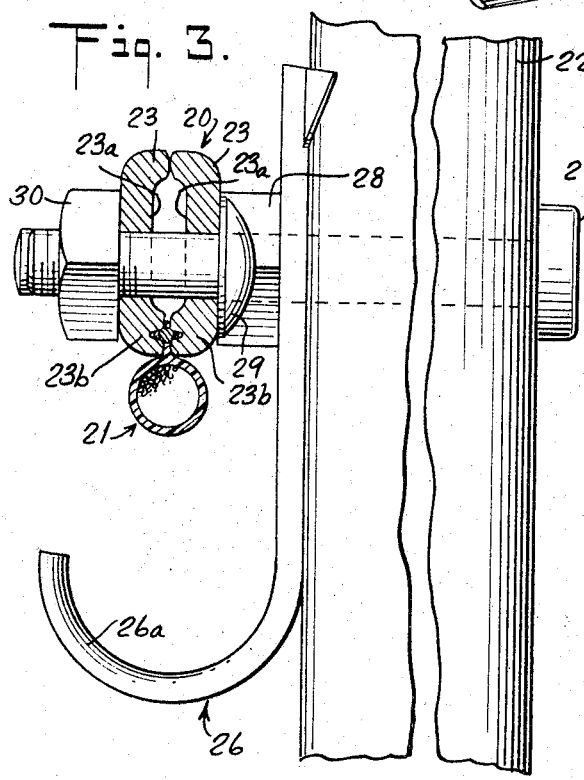
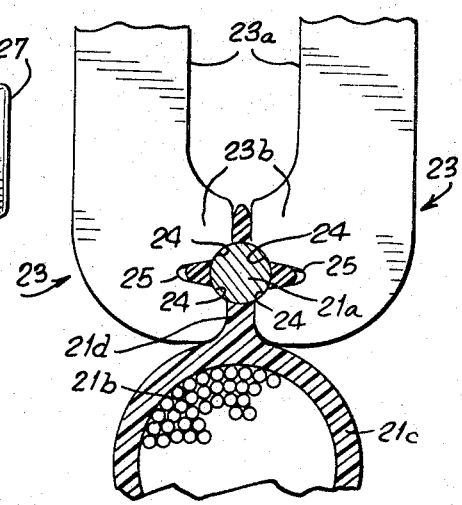
INVENTOR.
JOHN J. JAMES
BY
Kenyon & Kenyon
ATTORNEYS

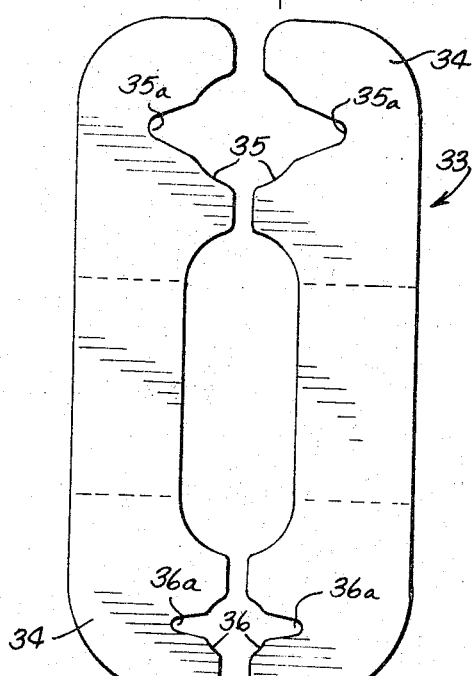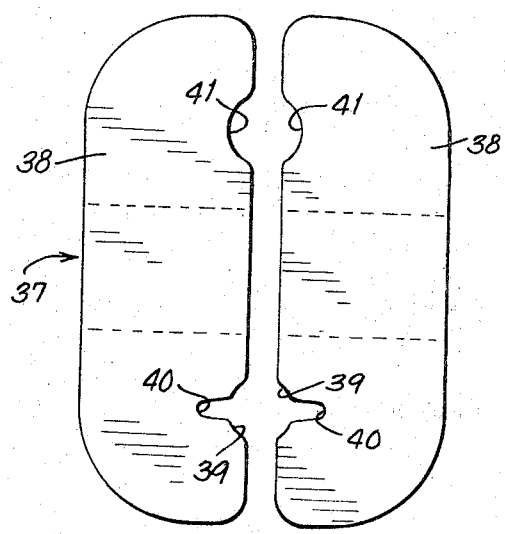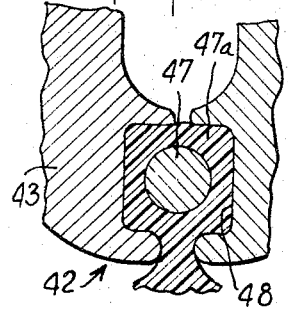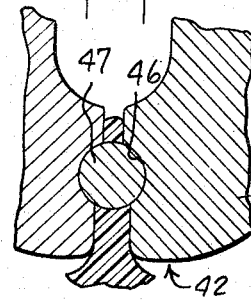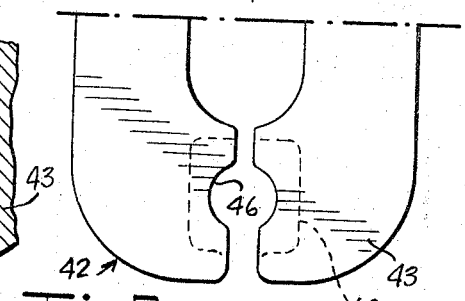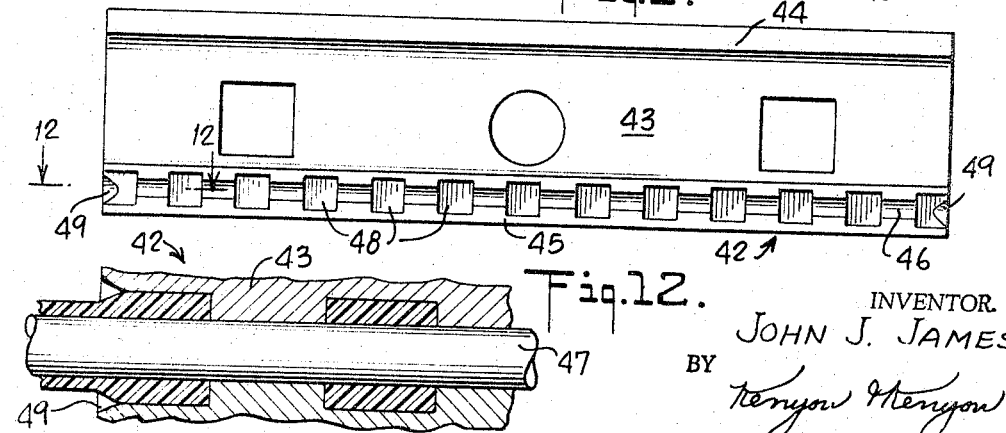

United States Patent Office 3,333,804
Patented Aug. 1, 1967

3,333,804
CABLE CLAMP
John J. James, Cranford, N.J., assignor to Diamond Expansion Bolt Co. Inc., Garwood, N.J., a corporation of New Jersey
Filed Sept. 16, 1965, Ser. No. 487,840
20 Claims. (Cl. 248—61)

The invention relates to a cable clamp and more particularly to a clamp for integrated messenger or "figure-8" telephone cable.

"Figure-8" cable includes a messenger or support cable, a cable of one or more conductors, and a jacket of insulating material such as plastic material which encloses the conductor cable and messenger and a web portion for supporting the conductor spaced apart and parallel to the messenger. The name of the cable is derived from the "figure-8" cross-section of the conductor, messenger and jacket. An advantage of "figure-8" cable is that it eliminates the need for hangers or spiral-wrapped lashing wire to support the cable with respect to the messenger. In addition the web of the sheath provides a continuous uninterrupted support for the cable. The sheath also serves to cover and protect the messenger.

Wind impinging on "figure-8" cable which has been strung with the conductors continually beneath the messenger can cause violent movement or dancing of the cable. The placing of a spiral-like twist in the cable when the cable is installed has been found to eliminate the dancing problem. However, the elimination of dancing by twisting the cable during installation can cause other problems. For example, if standard clamping devices are used to attach the messenger to the pole or other support, such clamping devices can allow the spiral twists to unwind or migrate toward the opposite end points of the cable and thus allow dancing to return. In addition, as the torsional forces in the cable are relieved by the unwinding of the messenger in the support clamp, the conductors can be subjected to undesirable levels of stress and the entire cable can be abraded by contact with the supporting hardware. If the jacket is cut through by abrasion, the elements can enter the cable and cause corrosion and failure.

Another problem encountered with "figure-8" cable is that clamps designed for use with core wire or cable messengers can cause the jacket to be torn adjacent to the clamp so that the messenger becomes exposed. In addition, such clamps can sever the web of the jacket and result in the conductors sagging away from the messenger. The rapid increase in the use of "figure-8" cable makes these problems particularly acute.

An object of the invention is to provide a clamp which will grasp a "figure-8" cable with sufficient pressure to prevent rotation of the cable with respect to the clamp.

Another object of the invention is to provide a clamp adapted to receive the insulation of the cable which is extruded when pressure is applied by the clamp to the insulation enclosing the messenger.

Still another object is to provide a clamp which can ground the messenger thereto when the clamp is tightened.

An additional object is to provide a cable clamp which can prevent the separation of the conductors from the messenger.

A further object of the invention is to provide a clamp which prevents entry of the elements through the insulating jacket.

*Eliminates need of stripping cable, saves time, prevents damage*

In one embodiment of the invention the clamp is adapted for gripping cable having a wire core and a jacket of yieldable material. The clamp includes a pair of jaw members each having at least one groove extending throughout its length adjacent and substantially parallel to one of the edge portions of the jaw member. The width of each of the grooves is adapted to correspond to one another and is selected in accordance with the size of the wire core in order to enable the surface of the grooves to abut adjacent to the wire core when the jaw members are positioned adjacent to one another with the grooves in a facing relationship. In addition, each of the jaw members has a relieved portion extending inwardly from at least one of the grooves therein. The relieved portion is adapted to receive at least a portion of the yieldable material of the jacket which is displaced by the gripping of the cable by the grooves. Furthermore, the clamp includes means for urging together the jaw members to grip the cable extending through the grooves. With this arrangement, at least a portion of the surface of the grooves can be brought adjacent to the surface of the wire core as the jacket is displaced into the relieved portions. As a result, the gripping of the clamp on the wire core is increased and the material in the relieved portions is available to seal the clamp with respect to the wire core.

In another embodiment of the invention the grooves have a substantially circular cross-section and the radius of curvature of the grooves is substantially equal to the radius of the wire core which is to be received therein. The common center of the radius of curvature of the grooves is disposed between the facing portions of the jaw members when the jaw members are separated by a distance which is less than the diameter of the wire core. This arrangement contributes to the tight fit of the clamp to the wire core as the jacket is displaced.

In still another embodiment of the invention, the relieved portions extend inwardly from the grooves and have a substantially V-shaped cross-section with the wider end portion thereof intersecting a segment of the groove. This form facilitates the entry of the jacket material into the relieved portion.

In an additional embodiment of the invention there is provided a plurality of recesses spaced apart from one another along the length of each of the grooves in order to increase the frictional engagement of the clamp to the jacket material.

In a further embodiment of the invention, the jaw members are in the form of a channel having a web portion and flange portion extending from the opposite edges of the web portion. The grooves for engaging the wire core are disposed in the free end surfaces of the flange positions. This construction enables the clamping forces to be concentrated at the flange portions of the clamp.

In still a further embodiment of the invention, additional grooves are disposed adjacent to and substantially parallel to each of the opposite sides of the groove in the jaw member. The additional grooves are adapted to receive a portion of the material of the jacket and form a seal with respect to the wire core.

Various other objects and advantages of the present invention will be readily apparent from the following detailed description, when considered in connection with the accompanying drawing forming a part thereof, and in which:

FIG. 1 is a front elevational view of the clamp showing it engaged with a "figure-8" cable and attached to a pole in conjunction with a J-hook;

FIG. 2 is a vertical section view of a "figure-8" cable;

FIG. 3 is a vertical section view taken along the line 3—3 in FIG. 1 and showing the clamp of the invention mounted on a pole and engaged with a "figure-8" cable.

FIG. 4 is an isometric view of one jaw member of the clamp of the invention showing its channel-shaped inner surface;

FIG. 5 is a fragmentary vertical section view of the clamp attached to the "figure-8" cable;

FIG. 6 is an end elevational view of the jaw members of an embodiment of the clamp of the invention which is adapted to engage "figure-8" cables having support wire of different outside diameters;

FIG. 7 is an end elevational view of the jaw members of another embodiment of the clamp of the invention which is adapted to clamp a "figure-8" cable and a ground wire;

FIG. 8 is a fragmentary end elevational view of a modification of the gripping portion of the clamp which includes recesses for receiving extruded insulation;

FIG. 9 is an elevational view of the interior of one jaw member of the clamp having rectangular openings as in FIG. 8;

FIG. 10 is a fragmentary vertical section view of the clamp shown in FIG. 9 illustrating the manner by which the insulation of a "figure-8" cable is extruded into the rectangular openings;

FIG. 11 is a fragmentary vertical section view of the clamp shown in FIG. 8 showing the insulation after extrusion at a section between two rectangular openings;

FIG. 12 is a horizontal view taken along the line 12—12 of FIG. 9 and showing the extrusion of insulation into the openings in the clamp;

Figure 13:
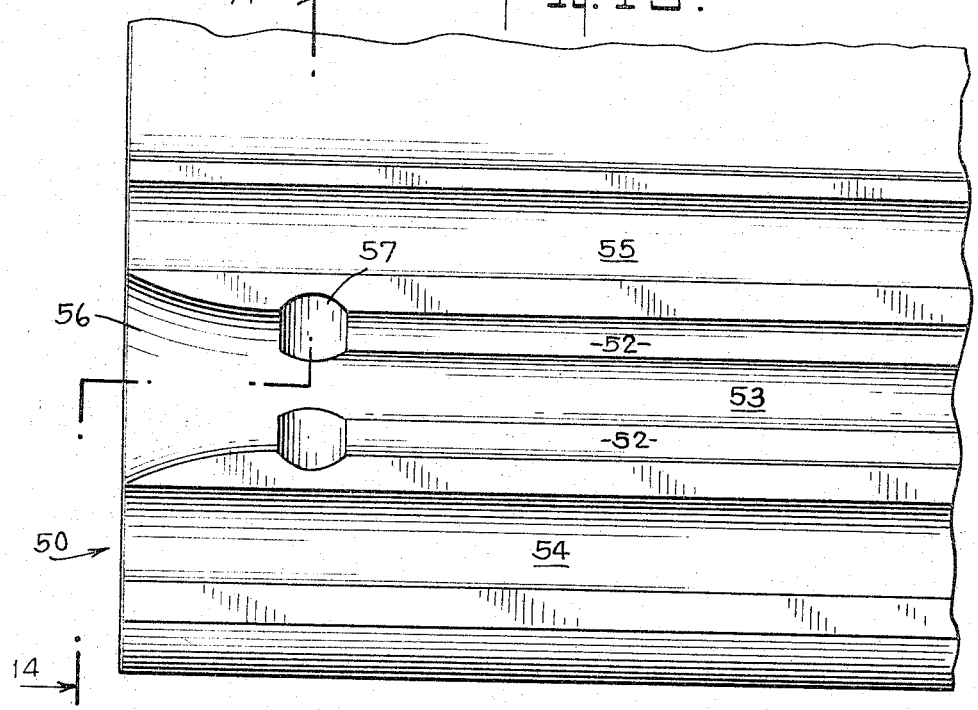
FIG. 13 is a fragmentary view of another embodiment of the jaw member of the invention having a flare and a sealing annulus adjacent to the groove for receiving the wire core and additional grooves for receiving the jacket material.

As shown in FIGS. 1 and 3, clamp 20 of the invention is adapted to mount cable 21 with respect to pole or other supporting structure 22. Cable 21, as shown in FIG. 2, is of the "figure-8" type having messenger or supporting wire core 21a, conductors 21b and jacket 21c of insulating material such as plastic material. The jacket material provides a homogeneous covering for the wire core and the conductors and by means of web 21d, supports the conductors from the wire core. The wire core can be formed by a single strand of wire or by a wire rope containing a plurality of strands.

As shown in FIGS. 1, 3 and 4, clamp 20 includes a pair of jaw members 23. Each of the jaw members is in the form of a channel having a web portion 23a and flange portions 23b extending from the opposite edges of the web portion. The free end surfaces of the flange portions, as shown in FIG. 3 are adapted to be placed in a facing relationship with ont another when web portions 23a are in a facing relationship. At least one of the flange portions of each of the jaw members is provided with groove 24 extending throughout its length (FIG. 5). Groove 24 can be provided with a circular cross-section adapted to fit the outside diameter of messenger or wire core 21a. As shown in FIGS. 3 and 5, the depth of groove 24 is selected to be sufficiently shallow, so that when grooves 24 are abutting messenger 21a, a space remains between the free ends of flange portions 23b. This arrangement insures that jaw members 23 apply the clamping force to messenger 21a.

Experience has shown that if the jaw members are provided with substantially semi-circular shallow grooves for engaging messenger 21a, the jacket material can prevent the jaw members from firmly engaging the messenger. As a result, movement between the messenger and clamp 20 can occur, especially under severe wind conditions or when an ice load is applied to the cable. In order to facilitate displacement of the jacket material adjacent to groove 24 during installation, relieved portions 25 extending inwardly with respect to the flange portion of the jaw members can be provided to receive at least a portion of the yieldable material of the jacket which is displaced as the clamp grips the messenger. In FIG. 5, jaw members 23 are shown as including relieved portions 25 extending from grooves 24. The clamping of the jaw members onto the messenger displaces the jacket material upwardly between the jaw members and into the relieved portions 25 so that the grooves can directly engage the messenger.

As jaw members 23 are clamped about the messenger, the material of jacket 21c is extruded into relieved portions 25 and upwardly between flange portions 23b. The clamping force of jaw members 23 is sufficient to enable grooves 24 to be brought directly into contact with the outer surface of messenger 21a. The messenger is customarily treated to make it corrosion resistant such as by galvanizing or by the application of a filling compound between the messenger and jacket 21c. After applying clamp 20 to cable 21, messenger 21a remains protected from the elements since the jacket material, which is extruded between the jaw members or flange portions and into the relieved portions, as well as web portion 21d, serve to prevent the entry of moisture into the messenger. Thus clamp 20 makes it possible to establish a tight grip directly on the messenger which can withstand forces tending to move the messenger with respect to the clamp and also protect the messenger from corrosion.

As shown in FIGS. 1 and 3, "J-hook" 26 can be used to facilitate the installation of cable 21 by means of clamps 20. Initially "J-hook" 26 is secured to pole 22 by means of bolt 27 and nut 28. Cable 21 is then strung along end portions 26a of the "J-hooks." Starting at a given pole, the linemen can apply clamp 20 to cable 21 and secure jaw members 23 to the messenger by means of bolts and nuts 30. During assembly, bolts 29 are extended through openings 31 in web portions 23a of jaw members 23. Clamp 20 and cable 21 are then mounted upon bolt 27 which extends through "J-hook" 26 and opening 31a in the clamp. Nut 32 serves to secure clamp 20 upon bolt 27.

Clamp 33 of FIG. 6 which includes jaw members 34 is provided with grooves 35 and 36 which are adapted to fit messenger or ground wires of unequal size. Similarly as in the case of clamp 20, grooves 35 and 36 are provided with relieved portions 35a and 36a, respectively, in order to receive the extruded jacket material. Clamp 33 therefore is adapted to fit two different size messengers or a messenger and a ground wire.

Clamp 37, shown in FIG. 7, is specifically adapted to engage a ground wire and a messenger. Clamp 37 includes jaw members 38 which have substantially rectangular cross-section as compared to the channel construction of clamps 20 and 33. Grooves 39 in jaw members 38 have relieved portions 40 extending therefrom, and are adapted to engage the messenger similarly as in clamps 20 and 33. Grooves 41 in the jaw members are adapted to engage a ground wire. Since the ground wire is normally without an insulating jacket, grooves 41 are not provided with the relieved portions for receiving the jacket material. Grooves 39 and 41 in jaw members 38 each correspond to only a segment of a circle so that when the jaw members are clamped about the messenger and the ground wire, the facing portions of the jaw members do not meet. As a result, the clamping force of the jaw members is received only by the messenger and the ground wire.

Clamp 42 shown in FIGS. 9–12, includes jaw members 43 which have a channel cross-section similarly as clamps 20 and 33. The free end of flange portion 44 is of a plane form and is adapted to abut against the corresponding flange portion of the mating jaw member. Flange portions 45 of the jaw members are provided with grooves 46 which are adapted to engage messenger 47 as shown in FIG. 11. In order to provide space in the flange portions for receiving the jacket material which is extruded away from the messenger 47, jaw members 53 in flange portions 45 are each provided with a plurality of recesses or pockets 48. As the clamp is forced about the jacket surrounding the messenger 47, jacket material 47a is extruded into recesses 48. In this way clamp 42 can be securely engaged to the messenger to prevent relative motion between the messengers and the clamp. At the same time, the jacket material is enabled to be displaced from the messenger and to contribute to the clamping force by being trapped and squeezed about the messenger. The recesses at the opposite ends of clamp 42 are provided with flares 49 extending in an outwardly expanding manner. Flares 49 provide clearance to messenger 47 so that the messenger and the jacket surrounding the messenger are not cut or nicked at the point that the cable passes beyond the end portion of clamp 42.

Clamps 20, 33, 37 and 42 can sever the jacket material at the point where the groove abuts against the messenger. The severing can be along a straight line where a single strand forms the messeneger. On the other hand, where a wire rope is used as the messenger, the severed portion extends along the length of the messenger in an irregular but substantially straight line due to the twist of the strands of the wire rope. Even though the jacket material is extruded between the jaw members and even though the web portion of the jacket material of the cable is engaged by the jaw members, it is possible for moisture to enter through the severed area and possibly lead to corrosion of the messenger.

Figure 14:
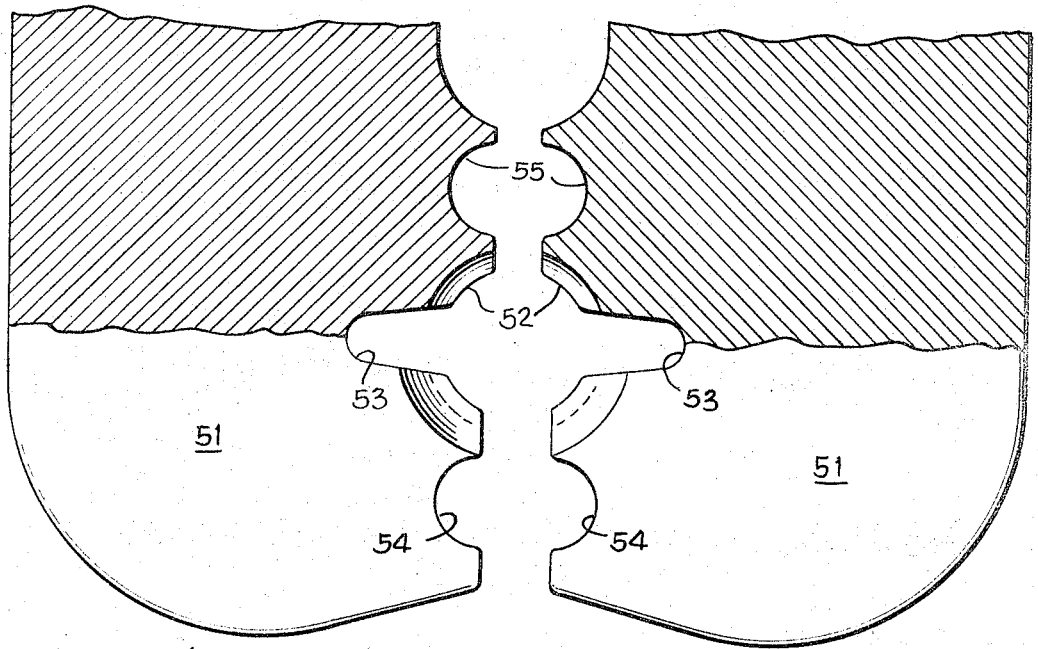
FIG. 14 is a fragmentary vertical section view taken along the line 14—14 in FIG. 13 and showing the groove, the relieved portions and the additional grooves.

Clamp 50, shown in FIGS. 13 and 14, employs the jacket material to completely seal any severed portion of the jacket material adjacent to the grooves in the jaw members of the clamp. Clamp 50, having jaw members 51, is provided with groove 52 for receiving the messenger. Relieved portions 53 are provided to receive jacket material which is extruded at right angles to the facing portions of the jaw members. The jaw members are also provided with additional grooves 54 and 55. Additional groove 54 is adapted to engage the web portion of the jacket material surounding the "figure-8" cable. Additional groove 55 is adapted to engage jacket material which is displaced upwardly as viewed in FIG. 14 during the clamping operation. As a result, additional grooves 54 and 55 when filled with displaced jacket material serve as two weather-tight barriers positioned spaced apart and parallel to the groove in which the messenger is disposed.

At the end of clamp 50, as shown in FIG. 13, groove 52 and relieved portions 53 are provided with flare 56. The flare protects the jacket material and the messenger from being cut by clamp 50 at the point where the cable issues from the clamp. In order to prevent the entry of moisture through flare 56, annular recess 57, which extends from groove 52 and intersects relieved portion 53, is provided. The annular recess causes a portion of the jacket material in the form of a toroid to be squeezed about the messenger adjacent to flare 56 and thereby form a seal about the messenger in the manner similar to that of an O-ring.

With clamp 50 it can be seen that the severing of the insulating jacket of the cable adjacent to the messenger by groove 52 cannot lead to the entrance of moisture into the messenger since additional grooves 54 and 55, in conjunction with annular recesses 57, form barriers of displaced jacket material which surround the messenger. In addition, the provision of additional groove 54 enables jaw member 51 to engage the jacket material extruded from adjacent the messenger and grip the material in a manner which prevents the web of the jacket between the conductors and the messenger from being pulled outwardly from between the jaw members. The pulling of the web of the jacket from between the jaw members can possibly be undesirable since it can result in the severed line in the jacket adjacent to the grooves of the clamp propagating along the length of the cable.

Although various embodiments of the invention have been shown and described herein, it is understood that certain changes and additions within the scope of the appended claims may be made by those skilled in the art without departing from the scope and spirit of this invention.

I claim:
1. A clamp for gripping cable having a wire core and a jacket of yieldable material thereon comprising a pair of jaw members each having at least one groove extending throughout its length adjacent and substantially parallel to a different one of the opposite edge portions thereof, the width of each of said grooves being adapted to correspond to one another and selected in accordance with the size of the wire core to enable the surface of each of said grooves to abut adjacent the wire core when said jaw members are positioned adjacent one another with said grooves in a facing relationship, each of said jaw members having a relieved portion extending inwardly from said grooves therein, said relieved portion being adapted to receive at least a portion of the yieldable material of the jacket which is displaced by the gripping of the cable by said grooves, and means for urging together said jaw members to grip a cable extending through said grooves therein, whereby at least a portion of the surface of said grooves can be brought adjacent to the surface of the wire core as the jacket is displaced into said relieved portions.

2. A clamp in accordance with claim 1 in which said grooves have a substantially circular cross-section, the radius of curvature of said grooves being substantially equal to the radius of the wire core to be received therein, the common center of the radius of curvature of said grooves being disposed between the facing portions of said jaw members when jaw members are separated by a distance less than the diameter of the wire core, whereby said grooves are adapted to abut substantially against the wire core.

3. A clamp in accordance with claim 1 in which said relieved portions of said jaw members are in a facing relationship and extend opposite to one another when said jaw members are positioned with said grooves in a facing relationship.

4. A clamp in accordance with claim 1 in which the sides of said jaw members which contain said grooves and are adjacent to one another when said jaw members are in a facing relationship are substantially flat.

5. A clamp in accordance with claim 1 in which said grooves have a substantially circular cross-section, the radius of curvature of said grooves being substantially equal to the radius of the wire core to be received therein, the common center of the radius of curvature of said grooves being disposed between the facing portions of said jaw members when jaw members are separated by a distance less than the diameter of the wire core, and in which said relieved portions extending inwardly from said grooves have a substantially V-shaped cross-section with the wider end portion of the cross-section intersecting a segment of the groove, whereby the jacket is adapted to enter the relieved portion as the groove abut substantially against the wire core.

6. A clamp in accordance with claim 1 in which said relieved portions comprise a plurality of recesses spaced apart from one another along the length of said grooves.

7. A clamp for gripping cable having a wire core and a jacket of yieldable material thereon comprising a pair of jaw members each in the form of a channel having a web portion and flange portions extending from opposite edges of said web portion, the free end surfaces of said flange portions opposite said web portion being adapted to be placed in a facing relationship with one another when said web portions of said jaw members are in a facing relationship, said free end surfaces of at least one corresponding flange portion of each of said jaw members having a groove extending throughout its length, the width of each of said grooves being selected in accordance with the size of the wire core to enable the surface of each of said grooves to abut adjacent the wire core when said jaw members are positioned adjacent one another with said grooves in a facing relationship, each of said jaw members having a relieved portion extending inwardly from said groove therein, said relieved portion being adapted to receive at least a portion of the yieldable material of the jacket which is displaced by the gripping of the cable by said grooves, and means for urging together said jaw members to grip a cable extending through said grooves therein, whereby at least a portion of the surface of said grooves can be brought adjacent to the surface of the wire core as the jacket is displaced into said relieved portions.

8. A clamp in accordance with claim 7 in which said free end surfaces of one flange portion of each of said jaw members is substantially continuous and adapted to bear upon one another said jaw members are urged to grip a cable extending through the grooves in the end surfaces of the other flange portion of each of said jaw members.

9. A clamp in accordance with claim 8 in which said substantially continuous end surfaces, are substantially convex about centers of curvature disposed along a line parallel to the longitudinal axis of said flange portion.

10. A clamp in accordance with claim 7 in which said grooves have a substantially circular cross-section, the radius of curvature of said grooves being substantially equal to the radius of the wire core to be received therein, the common center of the radius of curvature of said grooves being disposed between the facing portions of said jaw members when jaw members are separated by a distance less than the diameter of the wire core, whereby said grooves are adapted to abut substantially against the wire core.

11. A clamp in accordance with claim 7 in which said relieved portions of said jaw members are in a facing relationship and extend opposite to one another when said jaw members are positioned with said grooves in a facing relationship.

12. A clamp in accordance with claim 7 in which the sides of said jaw members which contain said grooves and are adjacent one another when said jaw members are in a facing relationship are substantially flat.

13. A clamp in accordance with claim 7 in which said grooves have a substantially circular cross-section, the radius of curvature of said grooves being substantially equal to the radius of the wire core to be received therein, the common center of the radius of curvature of said grooves being disposed between the facing portions of said jaw members when jaw members are separated by a distance less than the diameter of the wire core, and in which said relieved portions extending inwardly from said grooves have a substantially V-shaped cross-section with the wider end portion of the cross-section intersecting a segment of the groove, whereby the jacket is adapted to enter the relieved portions as the grooves abut substantially against the wire core.

14. A clamp in accordance with claim 7 in which said relieved portions comprise a plurality of recesses spaced apart from one another along the length of said grooves.

15. A clamp for gripping cable having a wire core and a jacket of yieldable material thereon comprising a pair of jaw members each having a groove extending throughout its length substantially adjacent and parallel to an edge portion thereof, the width of each of said grooves adapted to correspond to one another and selected in accordance with the size of the wire core to enable the surface of each of said grooves to abut adjacent the wire core when said jaw members are positioned adjacent one another with said grooves in a facing relationship, each of said jaw members having a relieved portion extending inwardly from said groove therein, said relieved portion being adapted to receive at least a portion of the yieldable material of the jacket which is displaced by the gripping of the cable by said grooves, said jaw members each having an additional groove disposed adjacent and substantially parallel to each of the opposite sides of said groove, said additional grooves being adapted to receive a portion of the material of said jacket and form a seal with respect to the wire core, and means for urging together said jaw members to grip a cable extending through said grooves therein, whereby at least a portion of the surface of said grooves can be brought adjacent to the surface of the wire core as the jacket is displaced into said relieved portions.

16. A clamp in accordance with claim 15 in which said jaw members are in the form of a channel having a web portion and flange portions extending from opposite edges of said web portion, the free end surfaces of said flange portions opposite said web portion being adapted to be placed in a facing relationship with one another when said web portions of said jaw members are in a facing relationship, said grooves and said additional grooves being disposed in corresponding free end surfaces of said flange portions.

17. A clamp in accordance with claim 15 in which said grooves have a substantially circular cross-section, the radius of curvature of said grooves being substantially equal to the radius of the wire core to be received therein, the common center of the radius of curvature of said grooves being disposed between the facing portions of said jaw members when jaw members are separated by a distance less than the diameter of the wire core, whereby said grooves are adapted to abut substantially against the wire core.

18. A clamp in accordance with claim 15 in which each of said jaw members is flared outwardly from adjacent the end portions of said grooves.

19. A clamp in accordance with claim 15 in which each of said jaw members has an annular recess intersecting said groove adjacent the end thereof, said recess being adapted to receive the material of the jacket and form the material into a seal formation surrounding the wire core.

20. A clamp in accordance with claim 19 and in which each of said jaw members is flared outwardly from adjacent said annular recess therein.

References Cited
UNITED STATES PATENTS

| | | | |
|---|---|---|---|
| 827,573 | 7/1906 | Sheeley | 248—74 |
| 2,950,338 | 8/1960 | Taylor | 174—117 X |
| 3,141,643 | 7/1964 | Shrewsbury | 248—61 X |
| 3,154,279 | 10/1964 | Fletcher et al. | 248—61 X |
| 3,160,378 | 12/1964 | Goewey | 248—61 |

ROY D. FRAZIER, *Primary Examiner.*

J. F. FOSS, *Assistant Examiner.*